United States Patent
Iriyama

(10) Patent No.: US 9,051,883 B2
(45) Date of Patent: Jun. 9, 2015

(54) CONTROL DEVICE FOR INTERNAL COMBUSTION ENGINE

(75) Inventor: Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 21 days.

(21) Appl. No.: 14/117,234

(22) PCT Filed: Feb. 15, 2012

(86) PCT No.: PCT/JP2012/053477
§ 371 (c)(1),
(2), (4) Date: Nov. 12, 2013

(87) PCT Pub. No.: WO2012/157302
PCT Pub. Date: Nov. 22, 2012

(65) Prior Publication Data
US 2014/0324319 A1  Oct. 30, 2014

(30) Foreign Application Priority Data
May 16, 2011 (JP) .................................. 2011-109145

(51) Int. Cl.
*F02D 41/22* (2006.01)
*F02D 9/02* (2006.01)
*F02D 11/10* (2006.01)
*F02D 41/02* (2006.01)

(52) U.S. Cl.
CPC .............. *F02D 9/02* (2013.01); *F02D 11/105* (2013.01); *F02D 2250/26* (2013.01); *F02D 41/021* (2013.01); *F02D 11/107* (2013.01); *F02D 2200/60* (2013.01); *F02D 2009/0296* (2013.01)

(58) Field of Classification Search
CPC ......... F02D 9/02; F02D 41/22; F02D 41/021; F02D 11/105; F02D 11/107; F02D 2009/0296
USPC ........................................ 701/102, 84, 88, 90
See application file for complete search history.

(56) References Cited

U.S. PATENT DOCUMENTS 4,987,872 A      1/1991  Geselle et al.
5,971,089 A  *  10/1999  Sawada ........................... 701/84

FOREIGN PATENT DOCUMENTS

| JP | 2695219 B2    | 12/1997 |
| JP | 2005-207260 A | 8/2005  |
| JP | 2005-291030 A | 10/2005 |
| JP | 2006-233870 A | 9/2006  |

* cited by examiner

Primary Examiner — Hieu T Vo
(74) Attorney, Agent, or Firm — Foley & Lardner LLP

(57) ABSTRACT

A power output of engine is restricted to become a power output which is calculated by using a first restriction accelerator operation degree when a brake operation with a brake pedal is detected in addition to an accelerator pedal operation with an accelerator pedal; and the power output of the engine is restricted to become a power output which is calculated by using a second restriction accelerator operation degree in place of the first restriction accelerator operation degree when an amount of change of the accelerator operation degree per unit time becomes larger than a preset certain value in a direction of depression of the accelerator pedal under a condition where the power output of the engine is restricted by using the first restriction accelerator operation degree, the second restriction accelerator operation degree being larger than the first restriction accelerator operation degree.

3 Claims, 4 Drawing Sheets

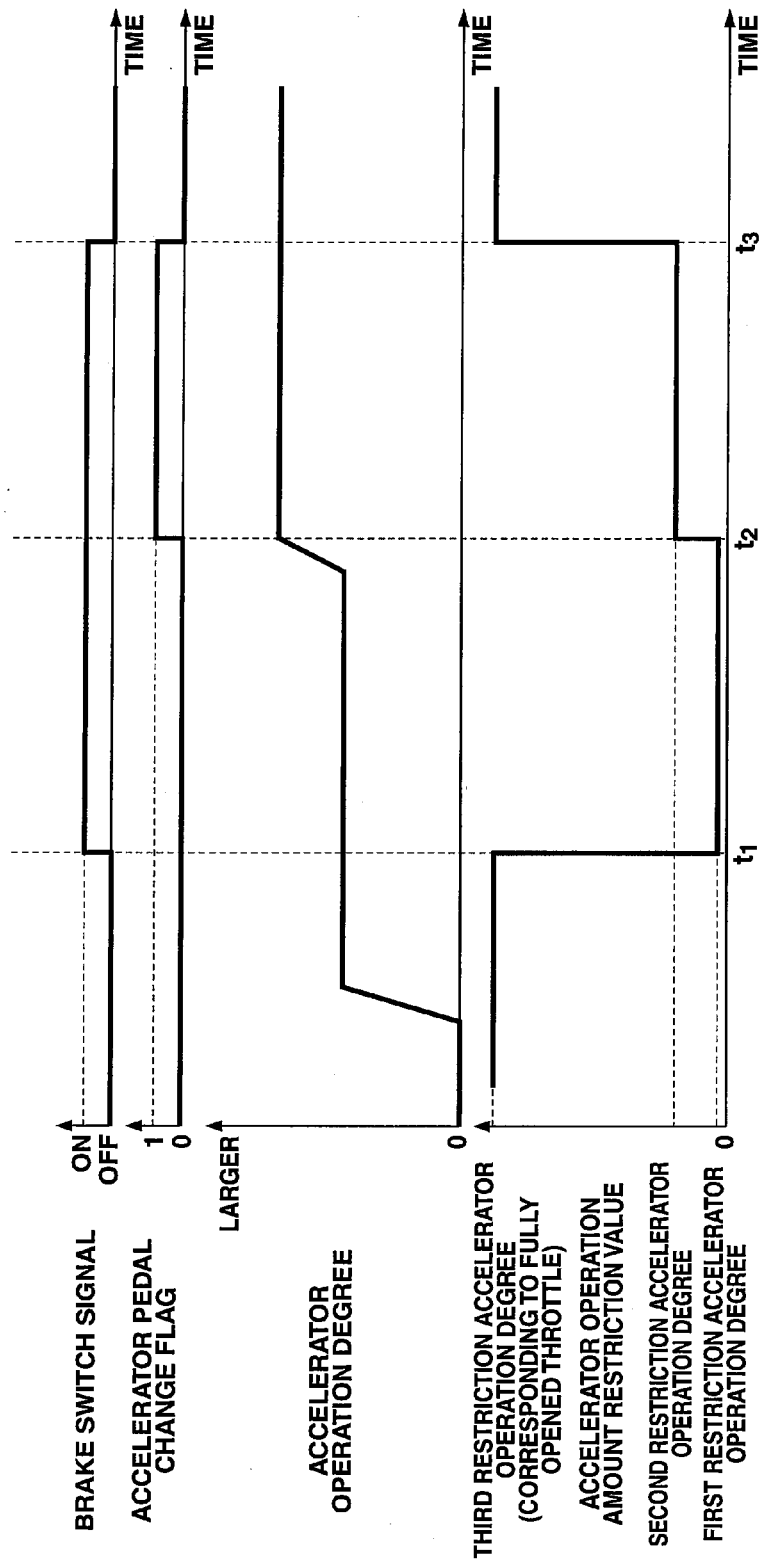

CONTROL DEVICE FOR INTERNAL COMBUSTION ENGINE

TECHNICAL FIELD

This invention relates to a control system for an internal combustion engine to restrict power output from the internal combustion engine when an accelerator pedal and a brake pedal are depressed at the same time.

BACKGROUND OF INVENTION

For example, Patent Citation 1 discloses the following technique: In one in which a power output of an internal combustion engine is restricted when an accelerator pedal and a brake pedal are depressed at the same time, the power output restriction of the internal combustion engine is removed even in a condition where the brake pedal is being depressed, if an amount of change of the accelerator pedal in a direction of depression is not smaller than a certain amount.

In this Patent Citation 1, the power output restriction is removed if an accelerator operation degree is not smaller than the certain amount. Accordingly, in case that a brake operation signal is not immediately restored (for example, a brake switch is not immediately turned OFF) owing to the viscosity of brake oil when an outside temperature is low even if the accelerator pedal is not stuck in the condition of being depressed, the fact that no acceleration is accomplished upon continuation of the power output restriction of the internal combustion engine can be prevented.

Additionally, since the power output restriction is removed if the amount of change of the accelerator operation degree is not smaller than the certain amount, the fact that running becomes difficult upon continuation of the power output restriction can be prevented even in case that a trouble arises in a condition where a brake operation signal is at ON-state, i.e., even in case of a trouble in which a signal representing continuation of brake operation is being outputted regardless of depression or non-depression of the brake pedal.

However, in such Patent Citation 1, if the amount of change of the accelerator operation degree is not smaller than the certain amount, the power output restriction of the internal combustion engine is removed even though a driver does not intend to do it. Accordingly, even in case that the power output restriction is necessary upon the fact that the accelerator pedal is caught by a floor mat or the like and therefore cannot be restored from its depressed state, there is a problem that the power output restriction is unavoidably removed if the amount of change of the accelerator operation degree becomes not smaller than the certain amount under vehicle vibration or the like.

PRIOR ART CITATIONS

Patent Citation

Patent Citation 1: Japanese Patent No. 2695219 publication

SUMMARY OF INVENTION

A control system for an internal combustion engine, according to the present invention is characterized in that the power output of the internal combustion engine is restricted to be not larger than a power output which is calculated by using a first restriction accelerator operation degree when the brake operation with the brake pedal is detected in addition to the accelerator pedal operation with the accelerator pedal, an opening degree of the throttle valve at the first restriction accelerator operation degree being set to be smaller than an opening degree at a fully opened state of the throttle valve; and the power output of the internal combustion engine is restricted to be not larger than a power output which is calculated by using a second restriction accelerator operation degree in place of the first restriction accelerator operation degree when an amount of change of the accelerator operation degree per unit time becomes larger than a preset certain value in a direction of depression of the accelerator pedal under a condition where the power output of the internal combustion engine is restricted by using the first restriction accelerator operation degree, the second restriction accelerator operation degree being larger than the first restriction accelerator operation degree, an opening degree of the throttle vale at the second restriction accelerator operation degree being set to be smaller than an opening degree at the fully opened state of the throttle valve.

According to the present invention, the power output restriction of the internal combustion engine can be prevented from being completely removed, even in case that the accelerator operation degree changes without intention of the driver.

BRIEF DESCRIPTION OF DRAWINGS

FIG. 4 is a timing chart showing an example of variation of each of a variety of parameters in a condition where the power output restriction is being made on the power output from the internal combustion engine.

MODE FOR CARRYING OUT INVENTION

Hereinafter, an embodiment of the present invention will be discussed with reference to drawings.

Figure 1:
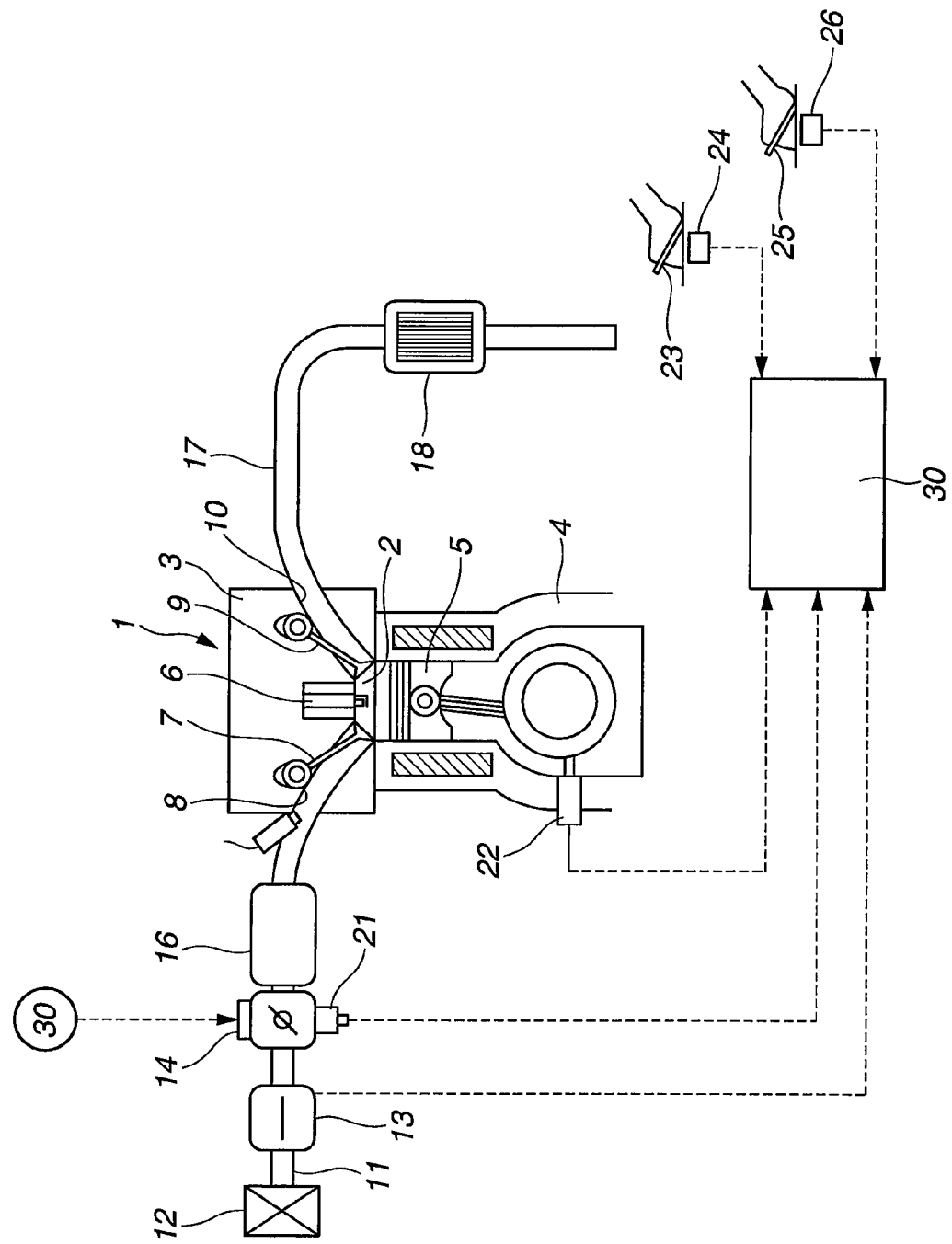
FIG. 1 is an explanatory view which diagrammatically shows a system configuration of an internal combustion engine to which the present invention is applied.

FIG. 1 is an explanatory view which diagrammatically shows a system configuration of an internal combustion engine 1 of the port injection type, to which the present invention is applied.

A combustion chamber 2 of the internal combustion engine 1 is defined by a cylinder head 3, a cylinder block 4 and a piston 5. A spark plug 6 is disposed at the central top section of the combustion chamber 2.

The cylinder head 3 is formed with an intake port 8 connected through an intake valve 7 to the combustion chamber 2, and an exhaust port 10 connected through an exhaust valve 9 to the combustion chamber 2.

An intake air passage 11 connected to the intake port 8 is provided with an air cleaner 12, an air flow meter 13 for detecting an amount of intake air, a throttle valve 15 of the electronically controlled type, whose opening degree is controlled through an actuator 14 by a control signal from a control unit 30 discussed after, and an intake air collector 16. An exhaust gas passage 17 connected to the exhaust port 10 is provided with a catalytic converter 18 for exhaust gas purification. It is to be noted that the reference numeral 19 in FIG. 1 denotes a fuel injection valve for injecting fuel into the intake port 8.

The internal combustion engine 1 is provided with a variety of sensors such as a throttle sensor 21 for detecting an opening degree (throttle opening degree) of the throttle valve 15, a crank angle sensor 22 for detecting a crank angle, an accelerator operation degree sensor for detecting an amount of depression of the accelerator pedal 23 by a driver, a brake switch 26 for detecting whether a brake pedal 25 is depressed by the driver or not, and the like. The brake switch 26 is turned ON under a condition where the brake pedal 25 is depressed, and turned OFF under a condition where the brake pedal 25 is not depressed.

Detection signals of these sensors are input to the control unit 30. Additionally, fuel injection amount and injection timing, ignition timing and the like of the internal combustion engine 1 are controlled by the control unit 30.

Additionally, the control unit 30 accomplishes such a control as to restrict a power output from the internal combustion engine 1 under a condition in which the accelerator pedal 23 and the brake pedal 25 are depressed at the same time in order to secure safety of the driver.

Specifically, in case that the brake switch 26 is turned ON upon a brake operation by the brake pedal 25 in addition to an accelerator pedal operation with the accelerator pedal 23, the power output from the internal combustion engine 1 is restricted to become not larger than a power output of the internal combustion engine depending on a first restriction accelerator operation degree which is a preset accelerator operation amount limit value. Here, the first restriction accelerator operation degree is a small accelerator operation degree which corresponds to a throttle vale opening degree smaller than a throttle valve opening degree at a fully opened state of the throttle valve and near a throttle valve opening degree at a nearly fully closed state or at a fully closed state of the throttle valve. The first restriction accelerator operation degree is set to make it possible to safely stop a vehicle.

Additionally, when an amount of change of the accelerator operation degree per unit time becomes larger than a preset certain value in a direction of depression of the accelerator pedal 23 under a condition in which the power output of the internal combustion engine is restricted by using the first restriction accelerator operation degree, the restriction of power output from the internal combustion engine 1 is relaxed so that the power output from the internal combustion engine 1 becomes not larger than a power output depending on a second restriction accelerator operation degree which is a preset accelerator operation amount restriction value and larger in value than the first restriction accelerator operation degree, in place of the power output depending on the first restriction accelerator operation degree. Here, the second restriction accelerator operation degree is smaller than an accelerator operation degree corresponding to a throttle valve opening degree at a fully opened state of the throttle valve and is smaller than the first restriction accelerator operation degree, in which the second restriction accelerator operation degree is so set that a braking force exceeds an power output of the internal combustion engine (or a driving force of the vehicle) if the brake pedal 25 is sufficiently depressed.

Additionally, the power output restriction depending on the first and second restriction accelerator operation degrees is removed at the time point where the brake switch 26 is turned OFF.

Figure 2:
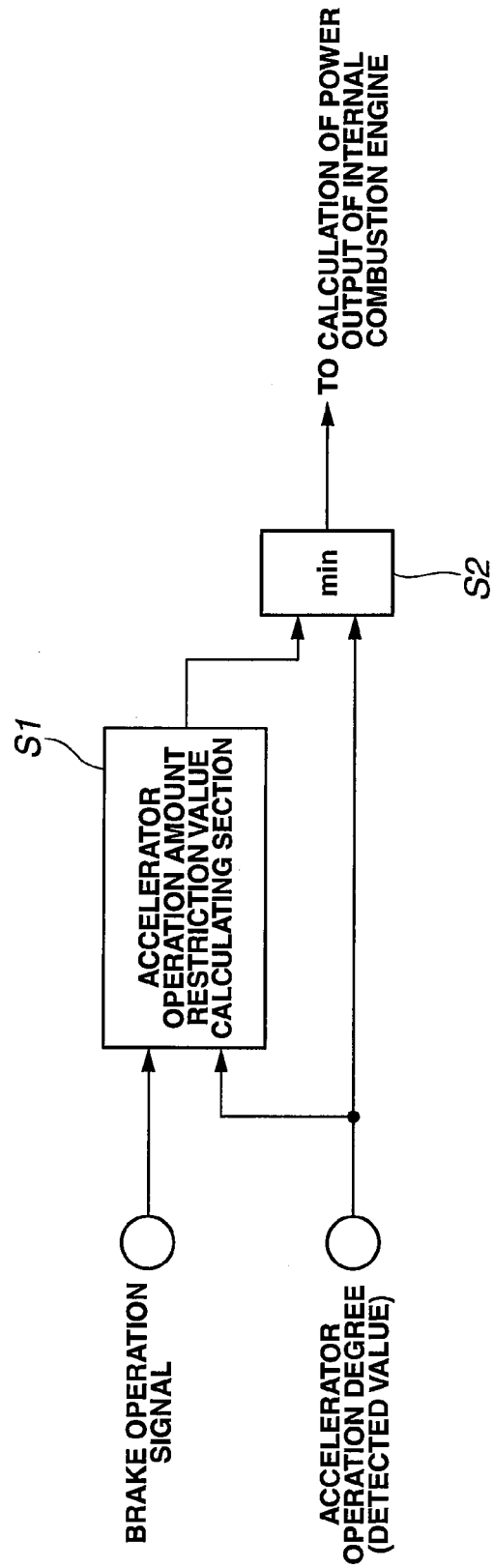
FIG. 2 is a block diagram showing the flow of a control in such a case that a power output restriction is made on power output from the internal combustion engine.

FIG. 2 is a block diagram showing the flow of a control in such a case that the power output restriction is made on power output from the internal combustion engine 1. It is to be noted that the flow of this control is carried out in the control unit 30.

In an accelerator operation amount restriction value calculating section denoted by S1, the accelerator operation amount restriction value is calculated depending on a detected value of the accelerator operation degree sensor 24 and a signal from the brake switch 26.

In the accelerator operation amount restriction value calculating section, the accelerator operation amount restriction value is always calculated during operation of the internal combustion engine 1, in which the first restriction accelerator operation degree at which the throttle vale opening degree becomes at the nearly fully closed state or near the fully closed state is calculated as the accelerator operation amount restriction value, under a condition where the accelerator pedal 23 and the brake pedal 25 are depressed at the same time. When the amount of change of the accelerator operation degree per unit time or the amount of change of the accelerator pedal in movement per unit time becomes larger than the preset certain amount under the condition where the accelerator pedal 23 and the brake pedal 25 are depressed at the same time, the second restriction accelerator operation degree larger than the first restriction accelerator operation degree is calculated as the accelerator operation amount restriction value. In a condition where the accelerator pedal 23 and the brake pedal 25 are not depressed at the same time, a third restriction accelerator operation degree which is an accelerator operation degree corresponding to a fully opened state of the throttle valve is calculated as the accelerator operation amount restriction value.

In S2, a comparison is made between the accelerator operation amount restriction value calculated in S1 and a detected value of the accelerator operation degree sensor 24, and then a smaller value of them is output. The power output of the internal combustion engine 1 is controlled to become a power output depending on the value output from S2.

Specifically, the output of the internal combustion engine 1 is controlled to become a value depending on the detected value of the accelerator operation degree sensor 24 in case that the detected value of the accelerator operation degree sensor 24 is not larger than the accelerator operation amount restriction value, whereas the output of the internal combustion engine is controlled to become a value depending on the accelerator operation amount restriction value in case that the detected value of the accelerator operation degree sensor 24 is larger than the accelerator operation amount restriction value. In case that the third restriction accelerator operation degree is set as the accelerator operation amount restriction value, the detected value of the accelerator operation degree sensor 24 is substantially output from S2, thereby establishing a condition where the power output restriction of the internal combustion engine 1 is removed.

Figure 3:
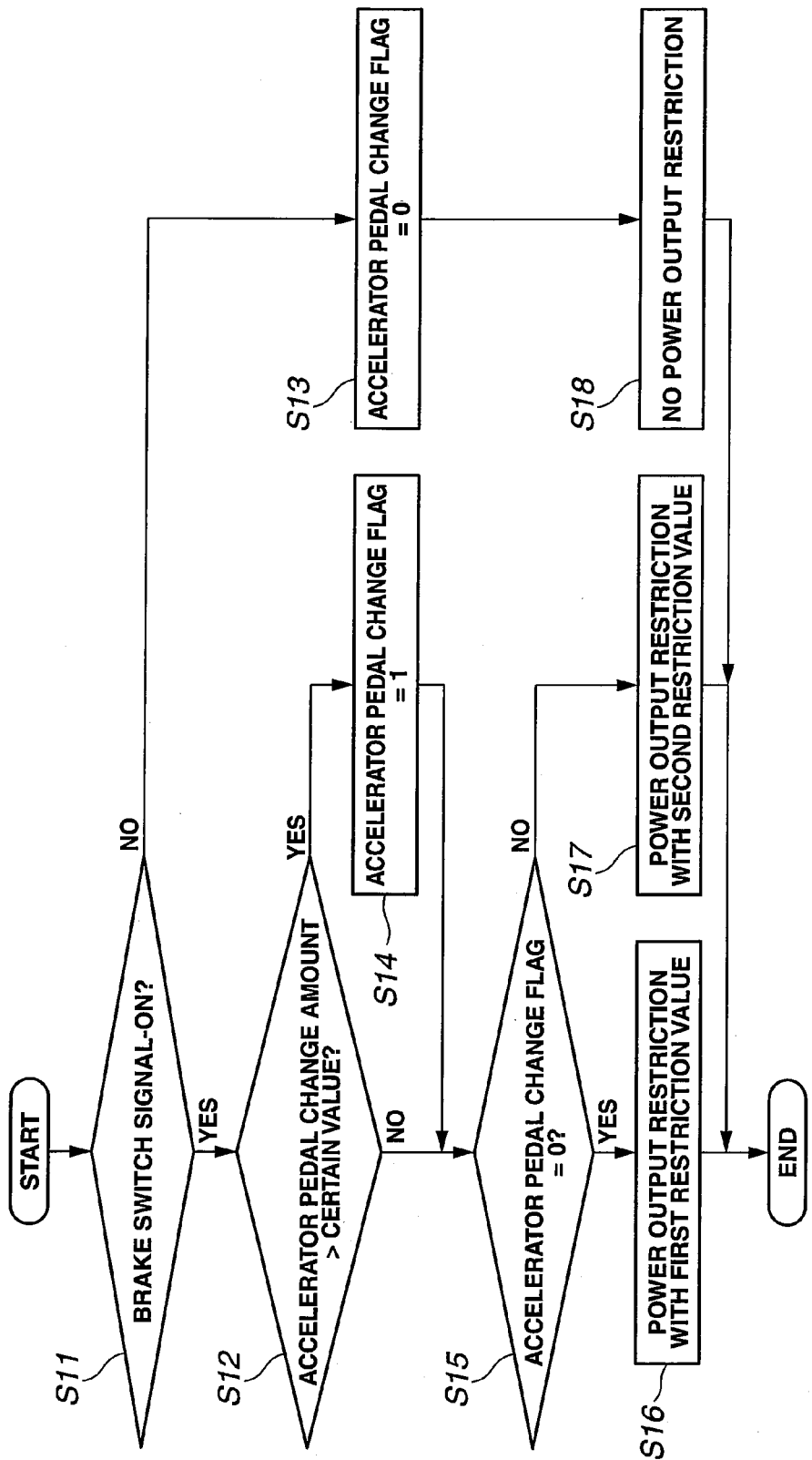
FIG. 3 is a flowchart showing the flow of a control in case that the power output restriction is made on power output from the internal combustion engine.

FIG. 3 is a flowchart showing the flow of a control in case that the power output restriction is made on power output from the internal combustion engine 1, in which this processing is carried out in the control unit 30.

At S11, a decision is made as to whether a brake switch signal is at ON-state or not. If at ON-state, the flow goes to S12. If at OFF-state, the flow goes to S13.

At S12, a decision is made as to whether the amount of change of the accelerator operation degree per unit time is larger than the preset certain amount or not. If larger, the flow goes to S14. If not larger, the flow goes to S15. At S14, setting of an accelerator pedal change flag=1 is made, and the flow goes to S15.

At S15, a decision is made as to whether setting of the accelerator pedal change flag=0 is made or not. If the setting of the accelerator pedal change flag=0 is made, the flow goes to S16. If the setting of the accelerator pedal change flag=1 is made, the flow goes to S17.

At S16, the power output of the internal combustion engine 1 is restricted so as to become not larger than the power output of the internal combustion engine 1 depending on the first restriction accelerator operation degree.

At S17, the power output of the internal combustion engine 1 is restricted so as to become not larger than the power output of the internal combustion engine 1 depending on the second restriction accelerator operation degree.

Meanwhile, if the brake switch signal is at OFF-state, the flow goes S18 upon setting of the accelerator pedal change flag=0 being made, thereby removing the power output restriction in order to obtain the power output depending on the detected value of the accelerator operation degree sensor 24. In other words, the accelerator operation amount restriction value is set at the third restriction accelerator operation degree.

FIG. 4 is a timing chart showing an example of variation of each of a variety of parameters in a condition where the power output restriction is being applied on the power output from the internal combustion engine 1.

If the brake switch 26 is put into ON-state (at the timing of a time t1) under a condition where the accelerator pedal 23 has been depressed, the accelerator operation amount restriction value is changed from the third restriction accelerator operation degree to the first restriction accelerator operation degree, thereby initiating the control for applying the restriction on the power output from the internal combustion engine 1.

If the amount of change of the accelerator operation degree per unit time becomes larger than the preset certain value so that the accelerator pedal change flag is changed from 0 to 1 (at the timing of a time t2) under a condition where the accelerator operation amount restriction value has been set at the first restriction accelerator operation degree, the accelerator operation amount restriction value is changed from the first restriction accelerator operation degree to the second restriction accelerator operation degree, thereby relaxing the power output restriction of the internal combustion engine 1.

Then, when the brake pedal 25 is restored so that the brake switch signal is put into OFF-state (at the timing of a time t3), the accelerator operation restriction value is changed from the second restriction accelerator operation degree to the third restriction accelerator operation degree, thereby removing the power output restriction of the internal combustion engine 1. It is to be noted that if such a decision that the amount of change of the accelerator opening degree per unit time is larger than the preset certain amount has been once made, the accelerator pedal change flag continues its state of "1" until the brake switch signal takes its OFF-state (until the power output restriction of the internal combustion engine 1 is removed), and changes into its state of "0" at the time point at which the brake switch signal takes its OFF-state.

Additionally, while the accelerator operation amount restriction value is shown as being changed stepwise at the timings of the times t1, t2 and t3 in FIG. 4, it is possible to make such a setting that the accelerator operation amount restriction value is changed with a certain inclination during a transitional period of changing. Furthermore, the accelerator operation amount restriction value may be changed from the second restriction accelerator operation degree to the first restriction accelerator operation degree when the accelerator pedal 23 is restored under a condition where the accelerator operation amount restriction value has been set at the second restriction accelerator operation degree.

As discussed above, in this embodiment, even in case that the accelerator operation degree is changed without intention of a driver under a condition where the power output of the internal combustion engine 1 is restricted to become not larger than the power output calculated by using the first restriction accelerator operation degree, the accelerator operation amount restriction value is limited to be changed from the first restriction accelerator operation degree to the second restriction accelerator operation degree, thereby preventing the power output restriction of the internal combustion engine 1 from being completely removed.

Further, in case that a brake operation is detected (the brake switch is turned ON) owing to causes such as trouble, response delay of hydraulic pressure and the like though the brake pedal is restored under a condition where the power output of the internal combustion engine 1 is being restricted with the first restriction accelerator operation degree so as to become not larger than the power output calculated by using the first restriction accelerator operation degree, the power output of the internal combustion engine 1 is restricted with the second restriction accelerator operation degree larger than the first restriction accelerator operation degree if the amount of change of the accelerator operation degree per unit time becomes larger than the preset certain value under depression of the accelerator pedal 23, thus making it possible to secure a required acceleration performance.

Additionally, since the power output restriction of the internal combustion engine 1 due to the first and second restriction accelerator operation degrees is removed at the time point at which the brake switch signal takes its Off-state (at the time point at which no brake operation has been detected), the power output restriction of the internal combustion engine 1 with the first and second restriction accelerator operation degrees can be continued until a driver loses his or her intention to want to accomplish deceleration.

What is claimed is:

1. A control system for an internal combustion engine, to restrict power output of the internal combustion engine, the control system comprising accelerator operation degree detecting means for detecting an operation amount of an accelerator pedal, brake operation detecting means for detecting a brake operation due to depression of a brake pedal, and a throttle valve disposed in an intake air passage, wherein the power output from the internal combustion engine is restricted when the brake operation with the brake pedal is detected in addition to the accelerator pedal operation with the accelerator pedal, wherein the power output of the internal combustion engine is restricted to be not larger than a power output which is calculated by using a first restriction accelerator operation degree when the brake operation with the brake pedal is detected in addition to the accelerator pedal operation with the accelerator pedal, an opening degree of the throttle valve at the first restriction accelerator operation degree being set to be smaller than an opening degree at a fully opened state of the throttle valve;

wherein the power output of the internal combustion engine is restricted to be not larger than a power output which is calculated by using a second restriction accelerator operation degree in place of the first restriction accelerator operation degree when an amount of change of the accelerator operation degree per unit time becomes larger than a preset certain value in a direction of depression of the accelerator pedal under a condition where the power output of the internal combustion engine is restricted by using the first restriction accelerator operation degree, the second restriction accelerator operation degree being larger than the first restriction accelerator operation degree, an opening degree of the throttle vale at the second restriction accelerator operation degree being set to be smaller than an opening degree at the fully opened state of the throttle valve.

2. A control system for an internal combustion engine, as claimed in claim 1, wherein the power output restriction of the internal combustion engine due to the first restriction accelerator operation degree or the second restriction accelerator operation degree is removed at a time point at which the brake operation has not been detected.

3. A control system for an internal combustion engine, as claimed in claim 1, wherein the first restriction accelerator operation degree is set at an accelerator operation degree near an accelerator degree corresponding to the throttle valve opening degree at a nearly fully closed state of the throttle valve.

* * * * *